US008354956B2

(12) United States Patent
Matyas et al.

(10) Patent No.: US 8,354,956 B2
(45) Date of Patent: Jan. 15, 2013

(54) SPACE SEGMENT PAYLOAD ARCHITECTURE FOR MOBILE SATELLITE SERVICES (MSS) SYSTEMS

(75) Inventors: Gerard J. Matyas, Bala Cynwyd, PA (US); Sudhakar K. Rao, Churchville, PA (US); Alan L. Stern, North Brunswick, NJ (US); Minh Tang, Yardley, PA (US); William J. Taft, Yardville, NJ (US); Ronald M. Hirschfield, Holland, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 814 days.

(21) Appl. No.: 12/492,099

(22) Filed: Jun. 25, 2009

(65) Prior Publication Data

US 2009/0262037 A1 Oct. 22, 2009

Related U.S. Application Data

(63) Continuation-in-part of application No. 11/480,497, filed on Jul. 5, 2006, now Pat. No. 7,710,340.

(60) Provisional application No. 60/758,674, filed on Jan. 13, 2006.

(51) Int. Cl.
*H04B 7/185* (2006.01)
*H01Q 3/00* (2006.01)
*H01Q 13/00* (2006.01)

(52) U.S. Cl. ...... 342/354; 342/372; 342/373; 343/781 R

(58) Field of Classification Search .................. 342/354, 342/372, 373; 343/775, 778, 779, 781 R, 343/878

See application file for complete search history.

(56) References Cited

U.S. PATENT DOCUMENTS

| | | | | |
|---|---|---|---|---|
| 5,422,595 | A | 6/1995 | Lott | |
| 5,936,588 | A | 8/1999 | Rao et al. | |
| 5,936,592 | A | 8/1999 | Ramanujam et al. | |
| 6,456,252 | B1 | 9/2002 | Goyette | |
| 7,075,495 | B2 | 7/2006 | Jung et al. | |
| 7,710,340 | B2 * | 5/2010 | Rao et al. | 343/781 R |
| 2004/0189538 | A1 | 9/2004 | Rao et al. | |
| 2005/0052333 | A1 | 3/2005 | Rao et al. | |

FOREIGN PATENT DOCUMENTS

| | | |
|---|---|---|
| EP | 0 420 739 | 4/1991 |
| EP | 1 170 823 | 1/2002 |

OTHER PUBLICATIONS

Naito et al., "A Method of Designing Feed-Array Excitation Coefficients for Array-Fed Reflector-Type Reconfigurable Beam Antennas", Electronics & Communications in Japan, Part I—Communications, Sep. 1, 1996, vol. 79, No. 9, pp. 81-90.

* cited by examiner

*Primary Examiner* — Dao Phan
(74) *Attorney, Agent, or Firm* — McDermott Will & Emery LLP

(57) ABSTRACT

A antenna system for generating and distributing power among a plurality of non-focused beams is provided The system comprises a reflector having a focal plane and a non-parabolic curvature configured to form the defocused beams. The curvature is configured to create a symmetrical quadratic phase-front in an aperture plane of the reflector. The system further comprises a plurality of feed antennas disposed in the focal plane of the reflector and configured to illuminate the reflector. Each feed antenna is configured to contribute power toward each of the defocused beams. The system further comprises a plurality of fixed-amplitude amplifiers, at least one of which corresponds to each feed antenna.

22 Claims, 17 Drawing Sheets

SPACE SEGMENT PAYLOAD ARCHITECTURE FOR MOBILE SATELLITE SERVICES (MSS) SYSTEMS

CROSS-REFERENCE TO RELATED APPLICATION

The present application is a continuation-in-part of U.S. patent application Ser. No. 11/480,497, entitled "RECONFIGURABLE PAYLOAD USING NON-FOCUSED REFLECTOR ANTENNA FOR HIEO AND GEO SATELLITES," filed on Jul. 5, 2006, which claims the benefit of priority under 35 U.S.C. §119 from U.S. Provisional Patent Application Ser. No. 60/758,674 entitled "RECONFIGURABLE PAYLOAD USING NON-FOCUSED REFLECTOR ANTENNA FOR HIEO AND GEO SATELLITES," filed on Jan. 13, 2006, the disclosure of which are hereby incorporated by reference in their entirety for all purposes.

STATEMENT REGARDING FEDERALLY SPONSORED RESEARCH OR DEVELOPMENT

Not applicable.

FIELD OF THE INVENTION

The present invention generally relates to satellite systems and, in particular, relates to space segment payload architectures for mobile satellite services (MSS) systems.

BACKGROUND OF THE INVENTION

Many mobile satellite services (MSS) architectures utilize multiport amplifiers (MPA) to provide the high power required to meet capacity needs in the area that they cover. These architectures may employ parabolic reflectors fed with arrays that are defocused from the focal plane of the reflector. In this arrangement, each beam is formed by a limited number of feed elements in the array, as dictated by the MPA architecture, and each beam employs both amplitude and phase control of the array elements. These MPA architectures are complex and require feed components that are designed to operate in severe conditions with respect to power demands, thermal issues and passive intermodulation (PIM) challenges. With MPA architectures, the ability to transfer capacity among beams is limited, so therefore must be predetermined prior to manufacture.

SUMMARY OF THE INVENTION

The present invention solves the foregoing problems by providing antenna systems and methods for generating and configuring a plurality of beams in which power may be selectably allocated among beams. The systems and methods do not rely upon multiport amplifiers (MPAs), but rather utilize dedicated fixed-gain amplifiers for each feed antenna in an array of antennas illuminating a non-focused reflector with a fixed amplitude distribution that may be either uniform or tapered. Because the feed array is disposed in the focal plane of the reflector, the antenna geometry is not adversely impacted. Because dedicated amplifiers are used for each feed antenna without the need for MPAs, the mass, cost and complexity of the system is reduced.

According to one embodiment of the subject disclosure, an antenna system is provided for generating and distributing power among a plurality of beams. The antenna system comprises a reflector having a focal plane and a non-parabolic curvature configured to form the beams. The curvature is configured to create a symmetrical quadratic phase-front in an aperture plane of the reflector. The antenna system further comprises a plurality of feed antennas configured to illuminate the reflector. Each feed antenna is disposed in the focal plane of the reflector. Each feed antenna is configured to contribute power toward each of the plurality of beams. The antenna system further comprises a beamforming network configured to divide an incoming signal into a plurality of sub-signals. Each sub-signal corresponds to one of the plurality of feed antennas. Each sub-signal also corresponds to each of the plurality of non-focused beams. The antenna system further comprises a plurality of fixed-amplitude amplifiers. At least one amplifier corresponds to each of the plurality of feed antennas. The at least one amplifier for each feed antenna is configured to amplify the corresponding sub-signal to generate an amplified sub-signal and to provide the amplified sub-signal to the corresponding feed antenna.

According to another embodiment of the subject disclosure, a method for generating and configuring a plurality of non-focused beams using an antenna system is provided. The antenna system includes a reflector having a non-parabolic curvature configured to create a symmetrical quadratic phase-front in an aperture plane of the reflector, and a plurality of feed antennas disposed in a focal plane of the reflector. The method comprises the step of dividing an incoming signal with a beamforming network into a plurality of sub-signals. Each sub-signal corresponds to one of the plurality of feed antennas. Each sub-signal also corresponds to each of the plurality of beams. The method further comprises the step of phase shifting the plurality of sub-signals to generate a corresponding sub-signal. The method further comprises the step of amplifying the plurality of sub-signals with a plurality of fixed-amplitude amplifiers. At least one amplifier corresponds to each of the plurality of feed antennas. The at least one amplifier for each feed antenna amplifies a corresponding sub-signal to generate an amplified sub-signal which is provided to the corresponding feed antenna. The method further comprises the step of illuminating the reflector with the plurality of feed antennas to generate the plurality of beams. The curvature of the reflector creates a symmetrical quadratic phase-front in an aperture plane of the reflector.

According to yet another embodiment of the subject disclosure, an antenna system for generating and distributing power among a plurality of beams is provided. The antenna system comprises a beamforming network configured to divide an input signal into a plurality of transmit sub-signals. Each transmit sub-signal corresponds to each of the plurality of beams. The antenna system further comprises a first plurality of fixed-amplitude amplifiers, each configured to amplify one of the plurality of transmit sub-signals to generate a corresponding amplified transmit sub-signal. The antenna system further comprises a plurality of diplexers, each configured to receive a corresponding one of the plurality of amplified transmit sub signals from a corresponding one of the first plurality of fixed-amplitude amplifiers and to provide the amplified transmit sub signal to a corresponding one of a plurality of feed antennas. The antenna system further comprises the plurality of feed antennas configured to illuminate a reflector. Each feed antenna is configured to contribute power toward each of the plurality of beams. The antenna system further comprises the reflector having a focal plane in which the plurality of feed antennas are disposed. The reflector has a non-parabolic curvature configured to create a symmetrical quadratic phase-front in an aperture plane of the reflector. Each of the plurality of diplexers is further configured to receive a corresponding one of a plurality of received sub-signals from the corresponding one of the plurality of feed antennas and to provide the received sub-signal to a corresponding one of a second plurality of fixed-amplitude amplifiers. The antenna system further comprises the second plurality of fixed-amplitude amplifiers, each configured to amplify a corresponding one of the plurality of received sub-signals to generate a corresponding amplified received sub-signal. The beamforming network is further configured to combine the plurality of amplified received sub-signals to generate an output signal.

According to yet another embodiment of the subject disclosure, an antenna system comprises a reflector having a non-parabolic curvature configured to create a symmetrical quadratic phase-front in an aperture plane of the reflector, a plurality of feed antennas disposed in a focal plane of the reflector, and a plurality of diplexers. Each diplexer is configured to receive a corresponding one of a plurality of received sub-signals from a corresponding one of the plurality of feed antennas and to provide the received sub-signal to a corresponding one of a plurality of fixed-amplitude amplifiers. The antenna system further comprises the plurality of fixed-amplitude amplifiers, each configured to amplify a corresponding one of the plurality of received sub-signals to generate a corresponding amplified received sub-signal. The antenna system further comprises a beamforming network configured to combine the plurality of amplified received sub-signals to generate an output signal.

It is to be understood that both the foregoing summary of the invention and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
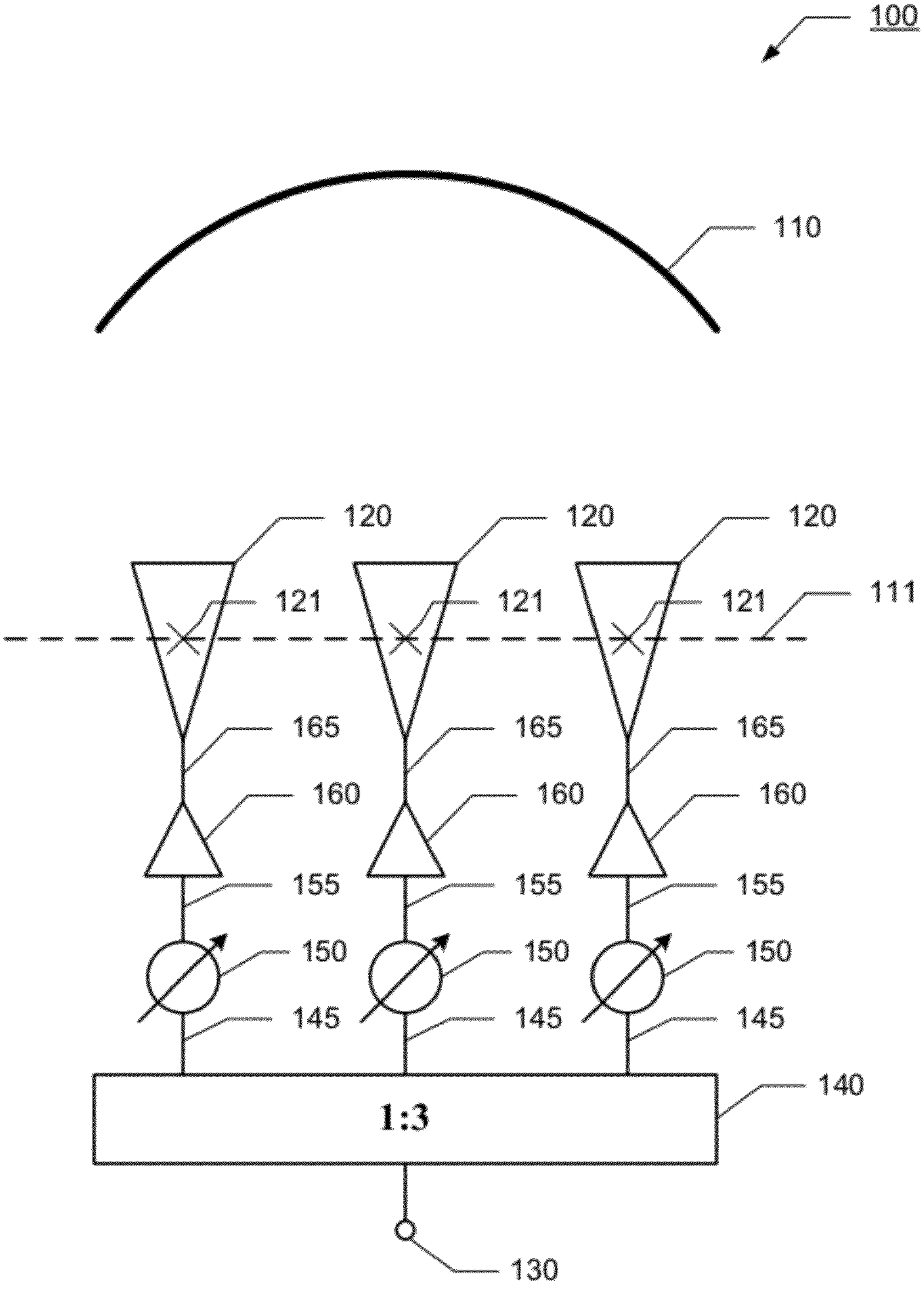
FIG. 1 depicts an antenna system according to one embodiment of the subject disclosure.

FIG. 1 illustrates an antenna system for generating and configuring a plurality of beams according to one embodiment of the subject disclosure. Antenna system 100 includes a reflector 110 having a non-parabolic curvature for forming the beams. A plurality of feed antennas 120 are disposed in the focal plane 111 of reflector 110 such that the phase centers 121 of the feed antennas 120 all lie in focal plane 111. It is noted that the phase center could be an average phase center over the desired band/bands. The feed antennas 120 illuminate reflector 110 to generate the beams in the following manner.

An incoming transmit signal 130 is divided by an incoming signal dividing network 140 into a plurality of sub-signals 145. Each sub signal 145 corresponds to one of the feed antennas 120, and each sub-signal 145 corresponds to every one of the plurality of beams (e.g., each feed antenna 120 will contribute a non-focused "beamlet" to each composite or "user" beam, such that every feed antenna 120 contributes power to every composite beam formed by system 100). Each sub-signal 145 is received from incoming signal dividing network 140 by a variable phase shifter 150 which phase shifts sub-signal 145 to generate a corresponding phase-shifted sub-signal 155. According to one aspect of the subject disclosure, an antenna system may utilize phase-only synthesis to configure (e.g., steer, shape, rotate, etc.) the beams that it generates. A corresponding fixed-amplitude amplifier 160 amplifies each phase-shifted sub-signal 155 to generate an amplified phase-shifted sub-signal 165 which is provided to the corresponding feed antenna 120. Feed antennas 120 together illuminate reflector 110 with amplified phase-shifted sub-signals 165 to generate the beams.

Amplifiers 160 are fixed-amplitude amplifiers. Accordingly, the configuration of the beams is accomplished with phase-only synthesis, as is discussed in greater detail below. The use of fixed-amplitude amplifiers allows antenna system 100 to operate with the same output power, maximizing the DC-to-RF conversion efficiency of the system. According to one embodiment, amplifiers 160 are traveling wave tube amplifiers ("TWTAs"). According to an alternate embodiment, amplifiers 160 may be solid state power amplifiers ("SSPAs") or any other fixed-amplitude amplifiers.

Reflector 110 has a non-parabolic curvature. According to one embodiment of the subject disclosure, the curvature of reflector 110 is optimized to minimize the number of elements (e.g., amplifiers, feed antennas, etc.) in the feed array and to efficiently combine the individual non-focused beamlets (i.e., the signals from each feed antenna 120). For example, according to one embodiment, the curvature of reflector 110 is selected so that the resultant beam has a quadratic phase distribution in the aperture plane of reflector 110. This curvature broadens the beams to about 2 to 3 times the breadth that would be generated by a parabolic reflector, thereby improving the adjacent beam overlap and also reducing the required number of feed array elements by a factor of 4, as is discussed in greater detail below with respect to FIG. 4.

According to one embodiment, reflector 110 is a 12 meter mesh reflector. According to other embodiments, reflector 110 may be any other size, and may be any other kind of reflector known to those of skill in the art. According to one embodiment, reflector 110 may include a single-axis gimbal mechanism (not illustrated) to provide ground track compensation for the rolling motion of a satellite vehicle on which antenna system 100 is deployed.

According to one embodiment, variable phase shifters 150 are 8-bit phase shifters with the ability to adjust the phase of a signal in increments of 1.4°. According to other embodiments, variable phase shifters 150 may be any kind of phase shifter known to those of skill in the art. Post-amplification signal losses are kept low by phase shifting the sub-signals 145 with variable phase shifters 150 prior to amplification, and by eliminating the need for MPAs.

While in the exemplary embodiment illustrated in FIG. 1, incoming signal dividing network 140 is illustrated as a 1:3 network (i.e., dividing incoming signal 130 into three sub-signals 145), the scope of the present invention is not limited to such an arrangement. Rather, an incoming signal dividing network may divide an incoming signal into any number of sub-signals, corresponding to the number of feed antennas, as will be apparent to one of skill in the art. For example, in an embodiment in which the antenna system has 37 feed antennas, an incoming signal dividing network will divide an incoming signal into 37 sub-signals.

The amplification in antenna system 100 is distributed by providing feed antennas 120 with corresponding amplifiers 160. This distributed amplification mitigates the risk of multipaction. While in the present exemplary embodiment illustrated in FIG. 1, one amplifier 160 corresponds to each feed antenna 120, the scope of the present invention is not limited to such an arrangement. Rather, as will be apparent to one of skill in the art, an antenna system may have more than one amplifier corresponding to each feed antenna, as is illustrated in greater detail with respect to FIG. 2.

Figure 2:
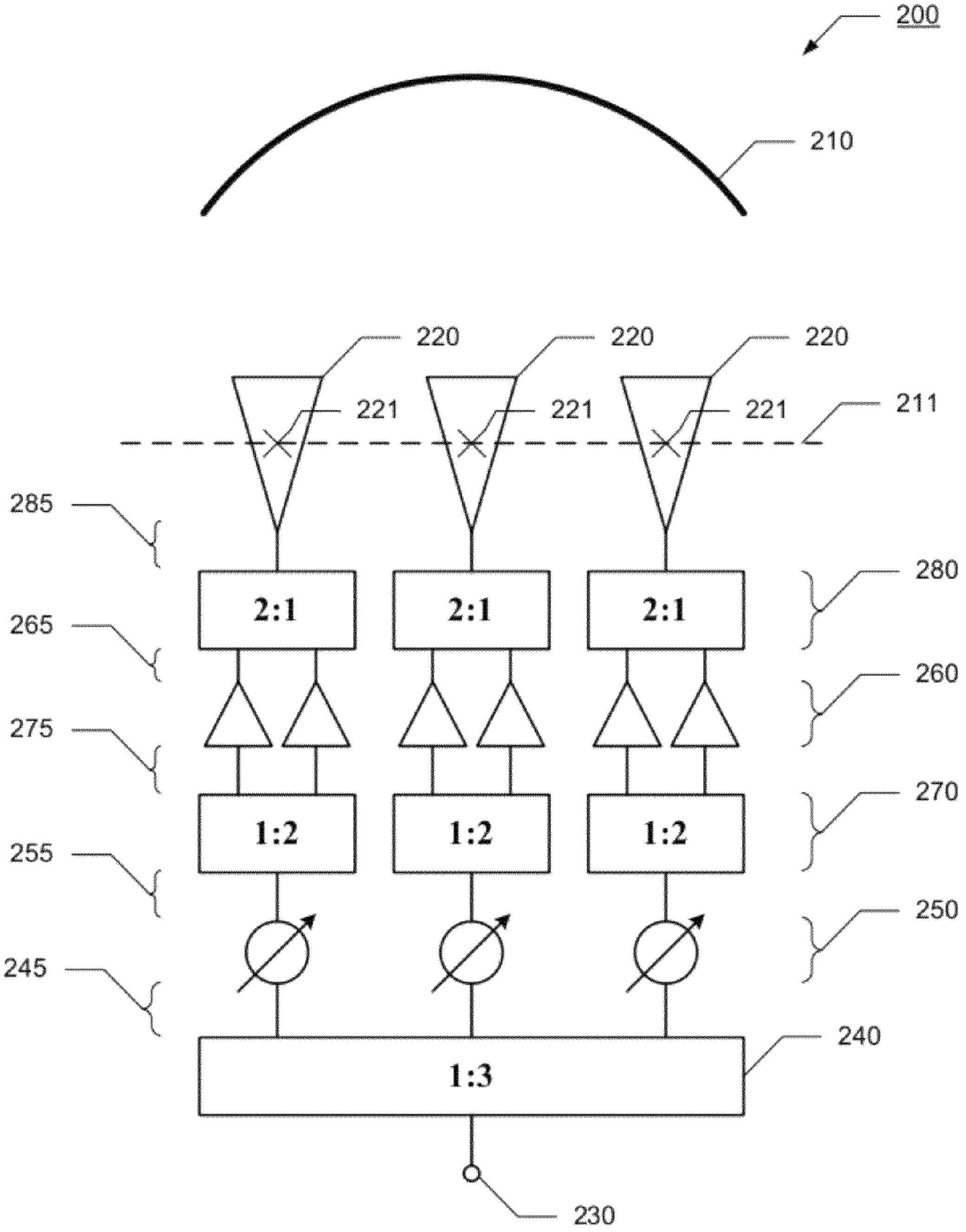
FIG. 2 depicts an antenna system according to another embodiment of the subject disclosure.

Turning to FIG. 2, an antenna system according to another embodiment of the subject disclosure is illustrated. Antenna system 200 uses the same power amplifier design as system 100, but provides twice the output power. Antenna system 200 includes a reflector 210 having a non-parabolic curvature for forming beams. A plurality of feed antennas 220 are disposed in the focal plane 211 of reflector 210 such that the phase centers 221 of the feed antennas 220 all lie in focal plane 211. The feed antennas 220 illuminate reflector 210 to generate the beams in the following manner.

An incoming signal 230 is divided by an incoming signal dividing network 240 into a plurality of sub-signals 245. Each sub signal 245 corresponds to one of the feed antennas 220, and each sub-signal 245 corresponds to every one of the plurality of beams (e.g., each feed antenna 220 will contribute a non-focused "beamlet" to each beam, such that every feed antenna 220 contributes power to every beam formed by system 200). Each sub-signal 245 is received from incoming signal dividing network 240 by a variable phase shifter 250 which phase shifts sub-signal 245 to generate a corresponding phase-shifted sub-signal 255. A corresponding pre-amp dividing network 270 divides each phase-shifted sub-signal 255 to generate a plurality of divided phase-shifted sub-signals 275. Each divided phase-shifted sub-signal 275 is provided to a corresponding fixed-amplitude amplifier 260. Each amplifier 260 amplifies the corresponding divided phase-shifted sub-signal 275 to generate an amplified divided phase-shifted sub-signal 265. Corresponding to each pre-amp dividing network 270 is a combining network 280, which receives the amplified divided phase-shifted sub-signals 265 from each amplifier in a group of amplifiers corresponding to one feed antenna 220 and combines them to generate a corresponding amplified phase-shifted sub-signal 285, which is provided to the corresponding feed antenna 220. Feed antennas 220 together illuminate reflector 210 with amplified phase-shifted sub-signals 285 to generate the beams.

According to one aspect of the subject disclosure, by providing each feed antenna in the feed array with a discrete amplifier (or discrete amplifiers), instead of powering the feed antennas with a multiport amplifier system, each feed antenna can contribute power to each of the plurality of beams formed by the system. In addition, the power allocated to each of the beams can be varied by the beamforming network (e.g., by changing the weighting of the different signal components), allowing for great flexibility in allocating higher capacity to beams with higher traffic. This configurability allows for increased EIRP to be provided for high-capacity beams, while beams with lower demands can be provided with lower EIRP.

According to one aspect of the subject disclosure, the RF power of an antenna system depends upon the number of feed antennas provided and the number of amplifiers associated with each feed antenna. Accordingly, Table 1, below, illustrates various arrangements in which the number of feed antennas and the number of amplifiers associated with each feed antenna are varied to provide a different levels of RF power. For the purposes of the present exemplary embodiment of Table 1, each amplifier is assumed to be a 230 W TWTA.

TABLE 1

| # of Feeds | # Amps/Feed | RF Power | DC Power |
|---|---|---|---|
| 32 | 1 | 7,360 | 12,475 |
| 16 | 2 | 7,360 | 12,475 |
| 37 | 1 | 8,510 | 14,424 |
| 20 | 2 | 9,200 | 15,593 |
| 48 | 1 | 1,1040 | 18,712 |

In the exemplary embodiment illustrated in FIG. 2, each feed antenna 220 has two corresponding fixed-amplitude amplifiers 260. The scope of the present invention, however, is not limited to such an arrangement. Rather, as will be apparent to one of skill in the art, the present invention has application to antenna systems in which any number of amplifiers corresponds to each feed antenna, including arrangements in which different numbers of amplifiers correspond to different feed antennas.

Figure 3:
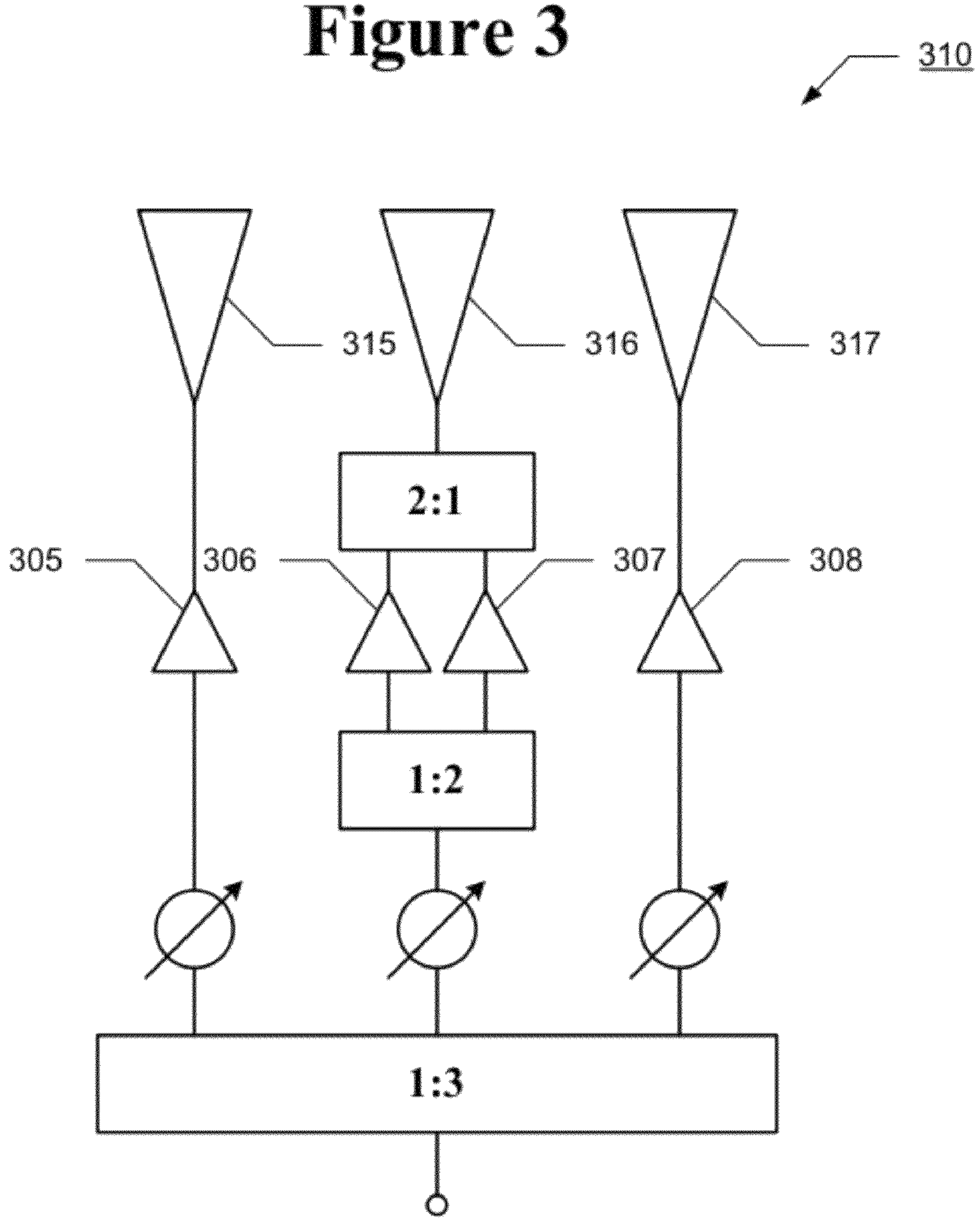
FIG. 3 illustrates a feed array according to one aspect of the subject disclosure.

For example, FIG. 3 illustrates a feed array 310 according to one aspect of the subject disclosure in which one feed antenna 316 corresponds to two fixed-amplitude amplifiers 306 and 307, while other feed antennas 315 and 317 each correspond to one fixed-amplitude amplifier 305 and 308, respectively. If each amplifier 305, 306, 307 and 308 have the same amplitude, feed antenna 316 will provide a non-focused beamlet with twice the amplitude of feed antennas 315 and 317. According to another aspect of the subject disclosure, the number of amplifiers may exceed the number of feed antennas, to provide redundancy (e.g., through a switching network) in the event that one or more of the amplifiers fails.

Figure 4:
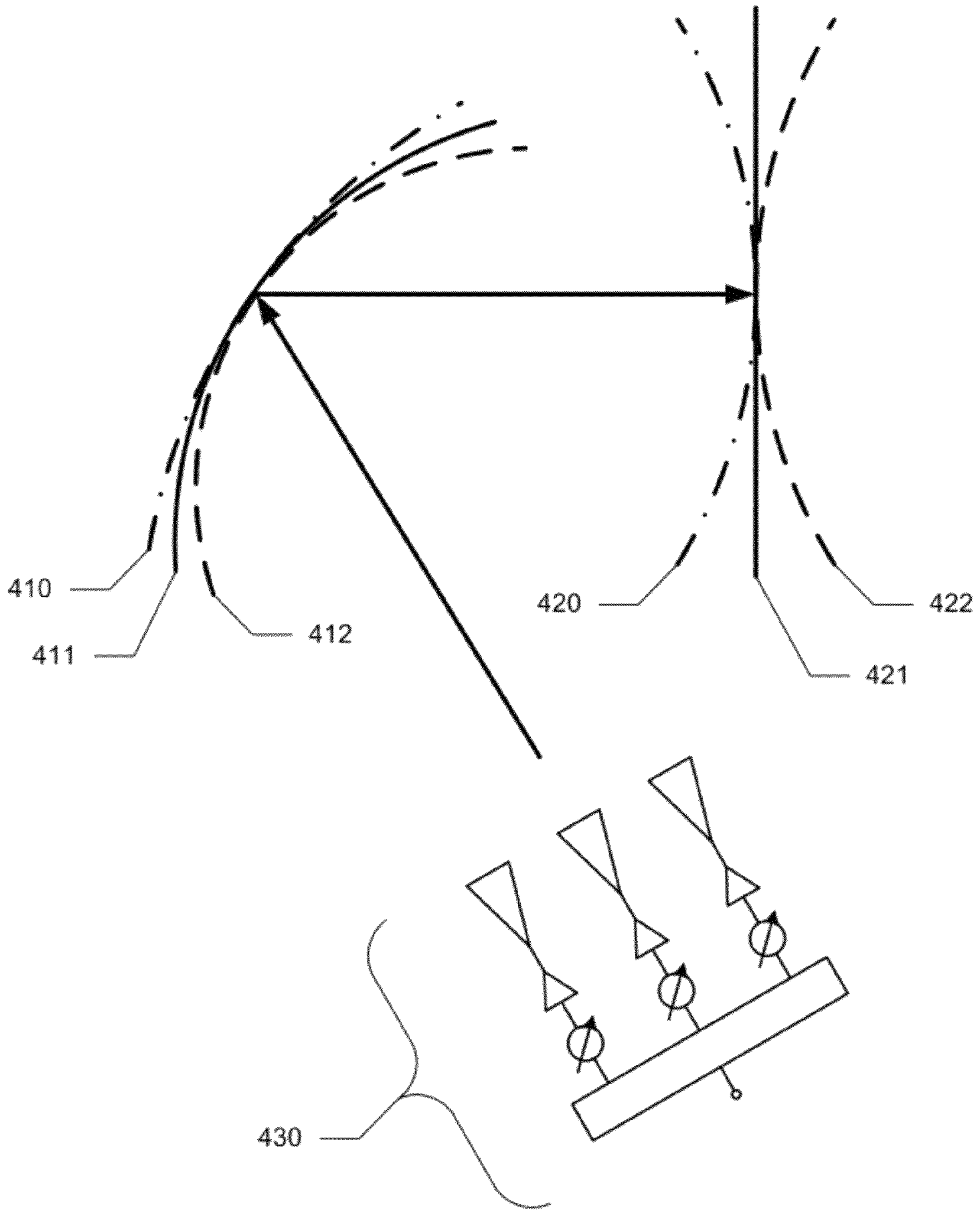
FIG. 4 illustrates the effect of the curvature of a reflector of an antenna system according to one aspect of the subject disclosure.

Turning to FIG. 4, the curvature of a reflector of an antenna system according to various embodiments of the subject disclosure is illustrated in greater detail. FIG. 4 illustrates a feed array 430 illuminating three different reflectors 410, 411 and 412. Feed array 430 is disposed in the focal plane (not shown) of all three reflectors 410, 411 and 412, although the angles in FIG. 4 have been exaggerated for clarity. Reflector 411 is a parabolic reflector. Accordingly, the corresponding wavefront 421 in the aperture plane of reflector 411 has a uniform phase. Reflector 410 has been "opened up" with respect to parabolic reflector 411 (i.e., the curvature of reflector 410 is less than that of reflector 411) such that the corresponding wavefront 420 in the aperture plane of reflector 410 has a quadratic phase distribution. A quadratic phase distribution significantly broadens the beams formed by reflector 410, reducing the number of feed elements required to perform the necessary beam configurations by a factor of 4. Similarly, reflector 412 has been "closed in" with respect to parabolic reflector 411 (i.e., the curvature of reflector 411 is greater than that of reflector 411) such that the corresponding wavefront 422 in the aperture plane of reflector 412 has a quadratic phase distribution.

While the non-parabolic reflectors 410 and 412 in FIG. 4 have been illustrated as possessing a curvature for generating a quadratic phase distribution in a wavefront at their respective aperture planes, the scope of the present invention is not limited to such an arrangement. Rather, the present invention has application to reflectors with any non-parabolic curvature to generate one or more non-focused beams.

While due to the constraints imposed by schematic diagrams, the feed arrays in the foregoing exemplary embodiments have been illustrated as including feed antennas arranged in a linear fashion, the scope of the present invention is not limited to such an arrangement. Rather, as will be apparent to one of skill in the art, the present invention has application to antenna systems in which the feed arrays include feed antennas in any arrangement. For example, in various aspects of the subject disclosure illustrated in FIG. 5, below, a feed array may be arranged as a two-dimensional array.

Figure 5:
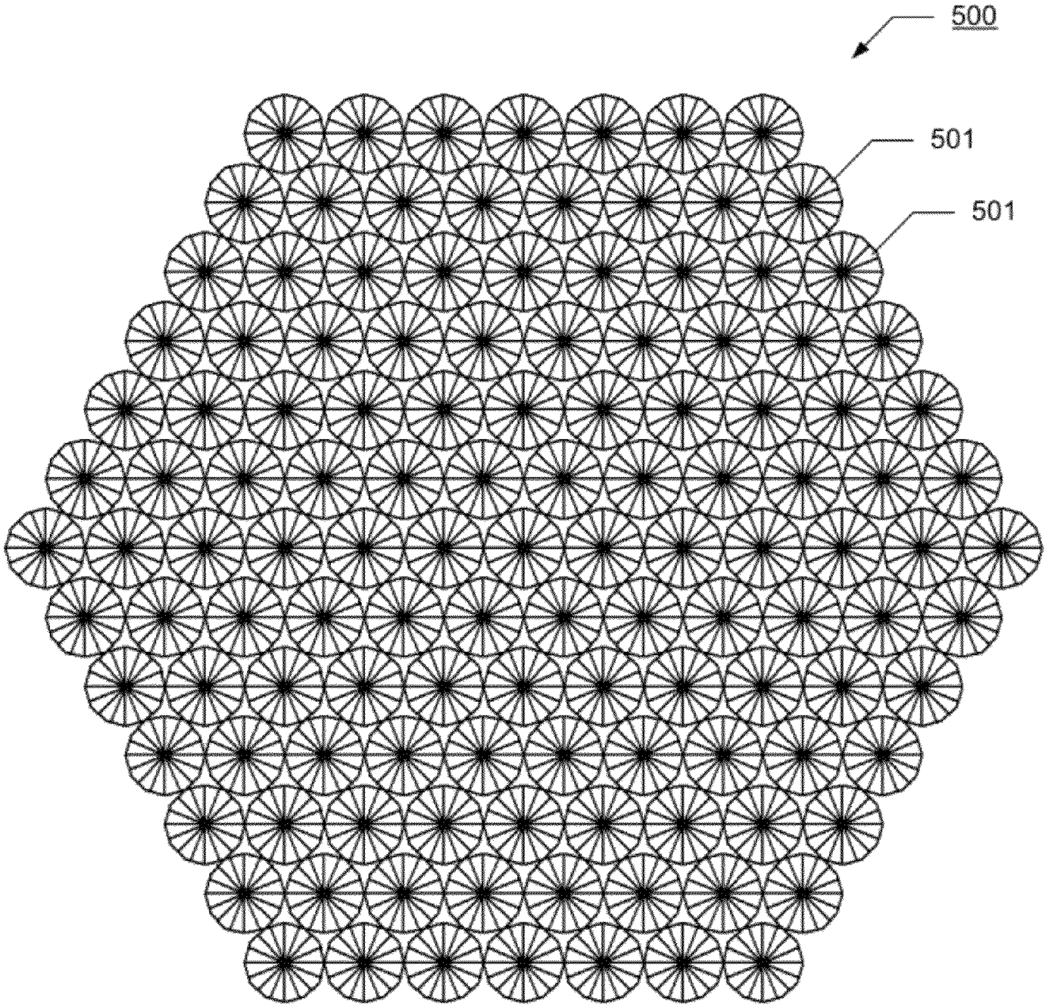
FIG. 5 illustrates an arrangement of a feed arrays according to one aspect of the subject disclosure.

FIG. 5 illustrates the arrangement of a feed array 500 suitable for use in a satellite according to one aspect of the subject disclosure. Feed array 500 includes 127 feed antennas 501, each of which has the same amplitude. The large number of feed antennas and the uniform distribution of amplitude therebetween provide extensive capability to redistribute power between a large number of user beams.

Figure 6:
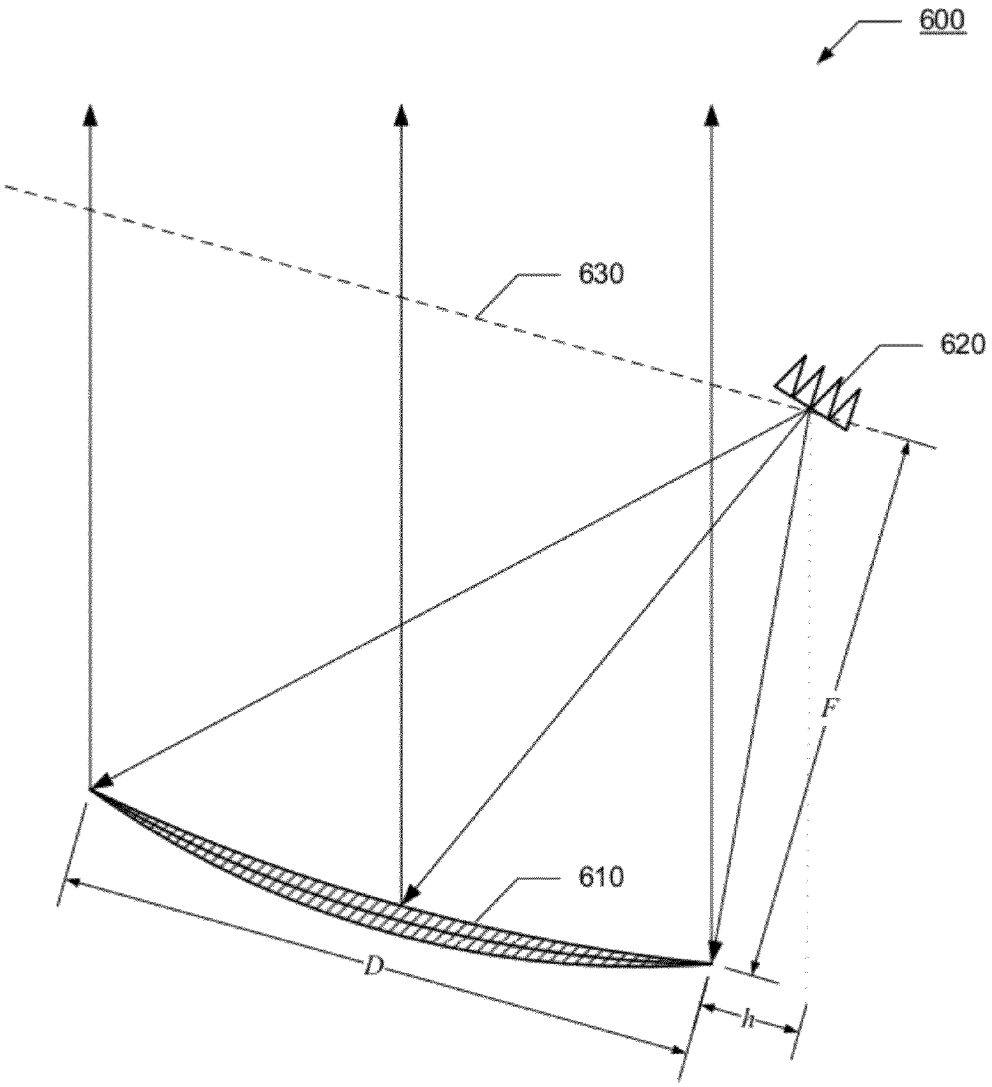
FIG. 6 illustrates the geometry of an antenna system according to one aspect of the subject disclosure.

Turning to FIG. 6, the geometry of an antenna system according to one embodiment of the subject disclosure is illustrated. Antenna system 600 includes non-parabolic reflector 610 and feed array 620 disposed in the focal plane 630 of reflector 610. Reflector 610 has a diameter D. Focal plane 630 is located a focal distance F from reflector 610. Feed array 620 is offset a height h from the edge of reflector 610. According to one embodiment, to minimize scan loss, reflector 610 has a diameter D of 13.9 m, a focal distance F of 9.4 m, providing a moderate F/D ratio of about 0.68, and an offset height of about 2.5 m.

Figure 7:
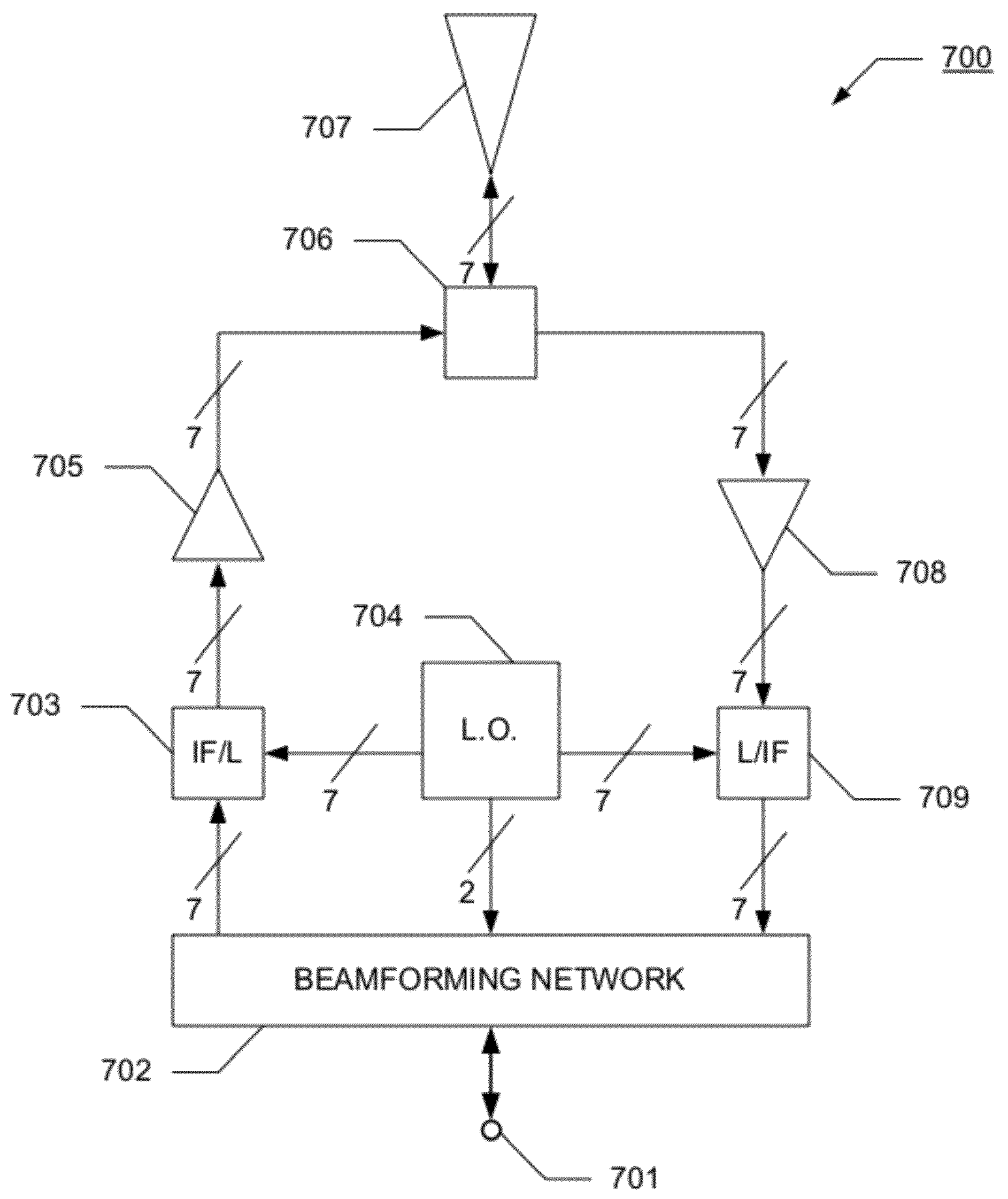
FIG. 7 depicts an antenna system according to another embodiment of the subject disclosure.

While in the foregoing exemplary embodiments, antenna systems with dedicated variable phase shifters corresponding to each feed antenna have been illustrated, the scope of the present invention is not limited to this particular arrangement. Rather, as will be readily understood by those of skill in the art, phase shifting of sub signals may be accomplished in a digital beamformer, rather than in a dedicated variable phase shifter. For example, FIG. 7 illustrates an antenna system according to another embodiment of the subject disclosure, in which a digital beamformer (beamforming network) performs phase-shifting on sub-signals to generate and configure a plurality of user beams. Antenna system 700 is illustrated with components for both transmitting and receiving using the same array-fed non-focused reflector as discussed in greater detail above. Evaluating the transmit side of the system, a signal 701 may be provided to beamforming network 702, which divides signal 701 into a plurality of sub-signals (illustrated in FIG. 7 by the bus width convention of a diagonal line passing through the signal path between beamforming network 702 and upconverter 703). Each sub-signal is phase-shifted by beamforming network 702 and is provided to a corresponding IF/L upconverter 703, which receives a clock signal from a local oscillator 704 and upconverts the sub-signals from the IF output of beamforming network 702 to the L-band downlink frequency. Each upconverted signal is provided to a corresponding fixed-amplitude amplifier 705 (e.g., a TWTA or an SSPA). Each amplifier 705 amplifies the corresponding sub-signal to generate an amplified sub-signal. Each amplified sub-signal is then provided to a diplexer 706, which passes each signal to a corresponding feed antenna 707. Following the path of a received signal, each antenna 707 passes a received signal to diplexer 706, which provides the received signal to an amplifier (e.g., an RLNA) 708. The amplified signals are then passed to corresponding L/IF downconverters 709, which receive a clock signal from local oscillator 704 and downconvert the received L-band signals to IF input for beamforming network 702. The downconverted signals are provided to beamforming network 702, which provides the output signal 701 to a feederlink (not illustrated).

Figure 8:
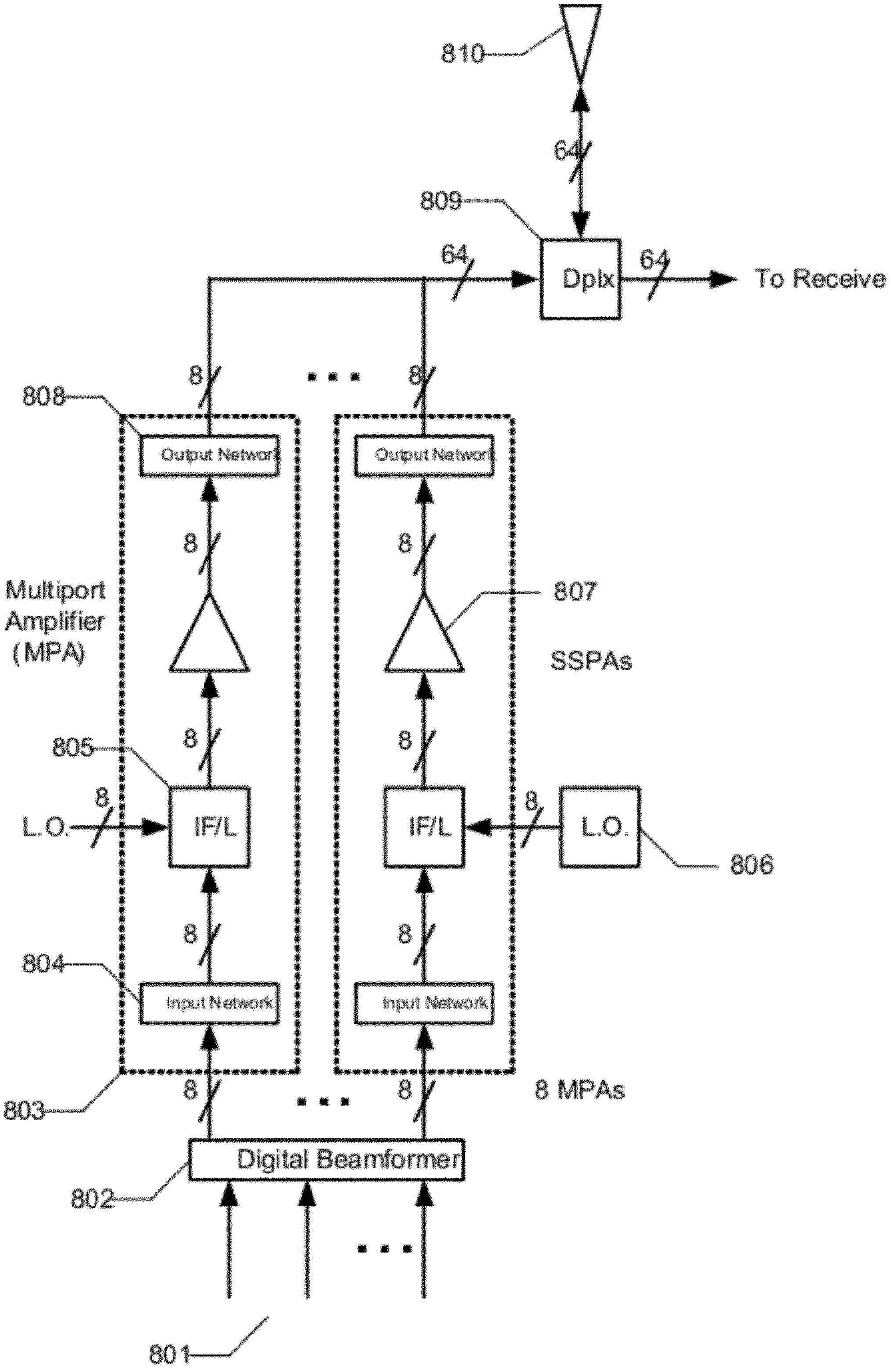
FIG. 8 depicts an antenna system according to another embodiment of the subject disclosure.

The dedicated-amplifier configuration of antenna system 700 may be more readily apprehended when compared to an antenna system which relies upon multi-port amplifiers for amplification, such as the antenna system illustrated in FIG. 8. One or more input signals 801 are provided to a digital beamformer 802, which divides each of the input signals by the number of radiating elements used to generate each beam, and provides amplitudes and phase shifts for the resulting sub-signals. The sub-signals are provided to a multiport amplifier (MPA) assembly 803, which has 2m inputs and outputs (where m is an integer). An input network 804 of MPA assembly 803 distributes the MPA inputs to the upconverter/power amplifier chains. An IF/L upconverter 805 upconverts the signal received from input network 804 from the IF output of digital beamformer 820 to the L-band downlink frequency, based upon a signal received from a local oscillator 806. Each upconverted signal is provided to a solid state power amplifier (SSPA) 807, which amplifies the signal and provides it to an output network 808, which combines the outputs of the upconverter/power amplifier chains and generates the MPA outputs. The MPA outputs are provided to a plurality of diplexers 809, which separate the transmit and receive signals (not illustrated) for simultaneous transmission and reception of the plurality of beams to and from each L-band radiating element 810.

According to one aspect of the subject disclosure, by providing each feed antenna in a feed array with a discrete amplifier (or discrete amplifiers), instead of powering the feed antennas with a multiport amplifier system, each feed antenna can contribute power to each of the plurality of beams formed by the system. In addition, the power allocated to each of the beams can be varied by the beamforming network (e.g., by changing the weighting of the different signal components), allowing for great flexibility in allocating higher capacity to beams with higher traffic.

Moreover, by providing each feed antenna in the feed array with a discrete amplifier (or discrete amplifiers), the amount of power provided by the transmit side of the system to diplexers 706 is far less than if a multiport amplifier system were used, allowing the diplexers to be far less robust—and therefore less massive, less costly, and less prone to thermal issues, multipaction, corona and passive intermodulation (PIM). For example, when compared to an antenna system with an N×N MPA output network, the amount of power that each diplexer 706 has to handle is reduced by a factor of N. Similar benefits also accrue to other feed components, which can similarly be less robust (e.g., as they have to handle less power) than components in systems relying upon MPA networks for their amplification needs.

Additional benefits accrue to an antenna system incorporating the non-focused reflector and fixed-gain per-feed amplification of various embodiments of the subject disclosure. In this regard, by eliminating the MPA network from an antenna system, the complexity of calibrating the phase and gain contributions from each feed chain to a plurality of beams is greatly reduced. This reduced complexity puts less computational strain on the system, and allows lower-cost and less massive components to be used. Moreover, as each feed element contributes to every beam, the loss of one feed element (whether resulting from a loss of one component in the feed line or damage to the feed antenna) does not reduce the number of beams that can be produced. Rather, the system is capable of graceful degradation, wherein the loss of a single feed element merely reduces the total power available to all the beams. Because the power can be distributed amongst the beams, however, such a loss may result in very little performance degradation (e.g., as the power of a beam with less traffic may be reduced while higher traffic beams are provided with the same level of power as they had before the degradation).

While in the foregoing exemplary embodiments, antenna systems with a single feed array illuminating a single non-focused reflector are illustrated, the scope of the present invention is not limited to such an arrangement. Rather, the present invention has application to antenna systems in which multiple reflectors (one or more of which are non-focused) are illuminated by a single array of feed elements. Such multiple-reflector systems may provide greater configurability for beam forming and beam steering, at the expense of extra mass (e.g., of the extra reflector).

Figure 9:
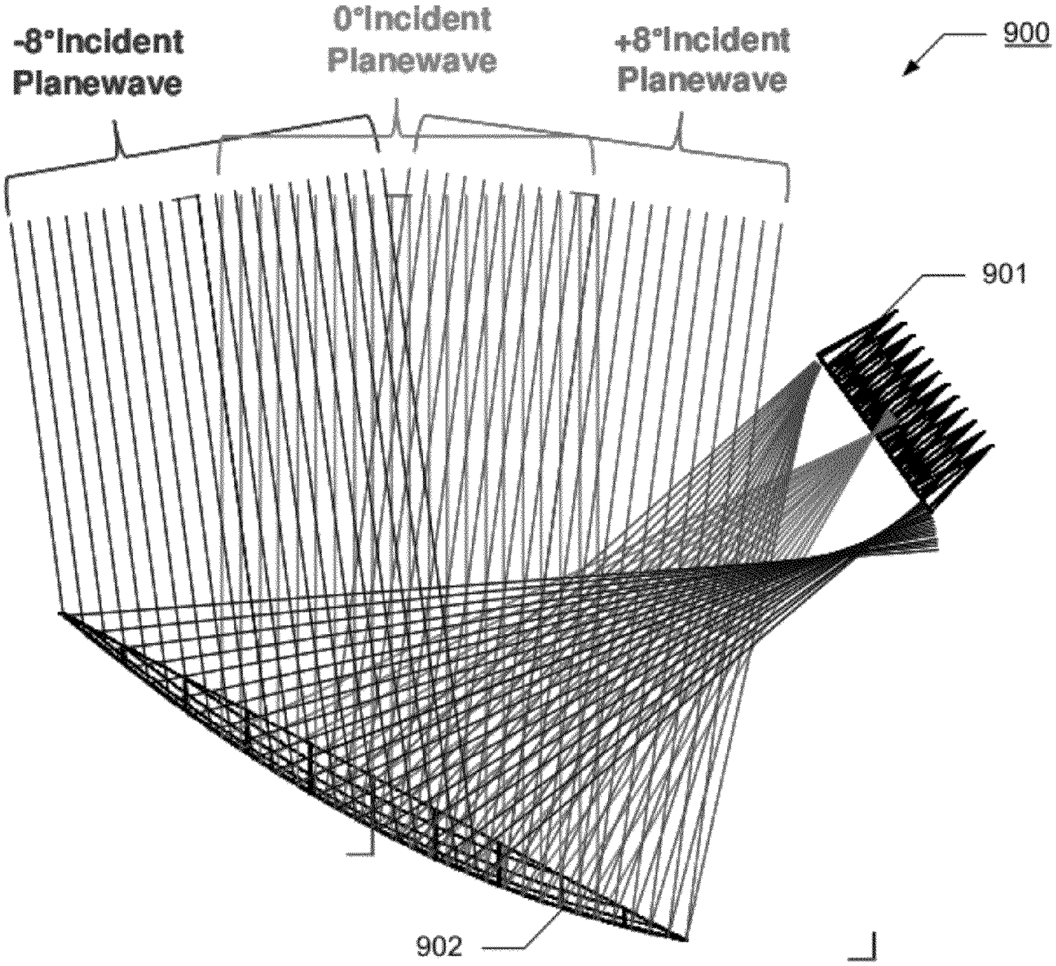
FIGS. 9 to 11 illustrate forming multiple beams using a focused or a physically defocused reflector.
Figure 10:
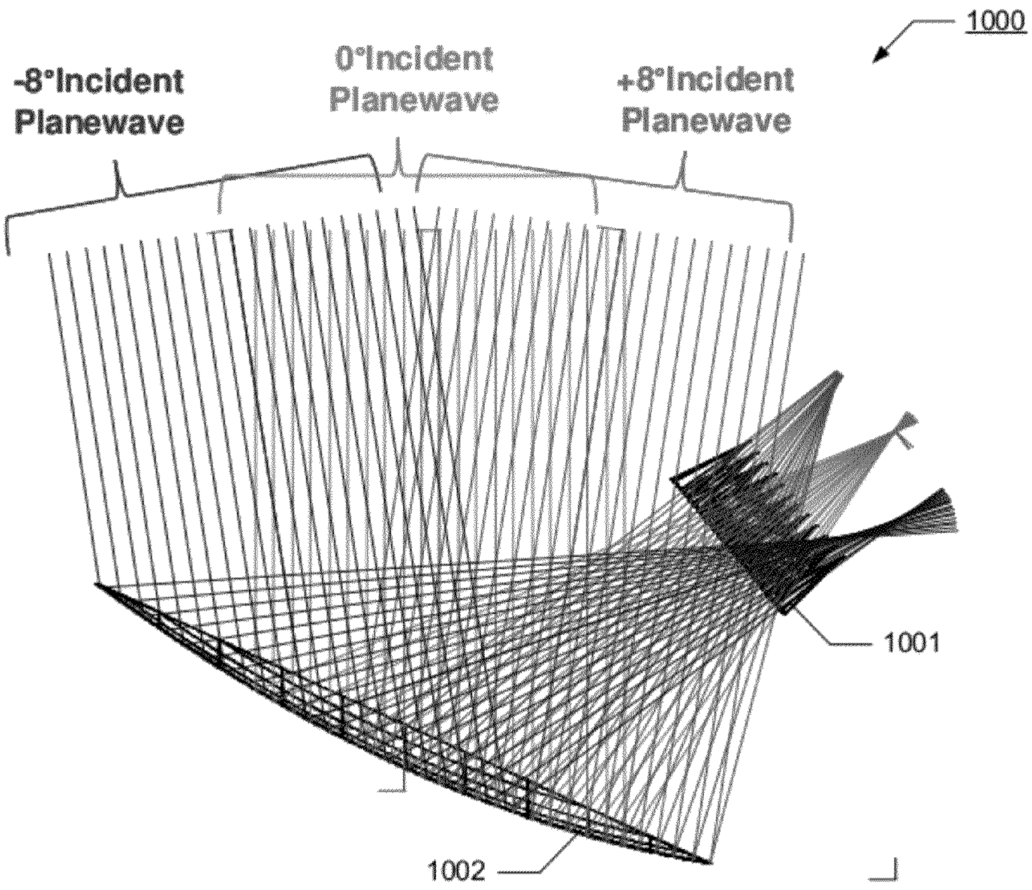
Figure 11:
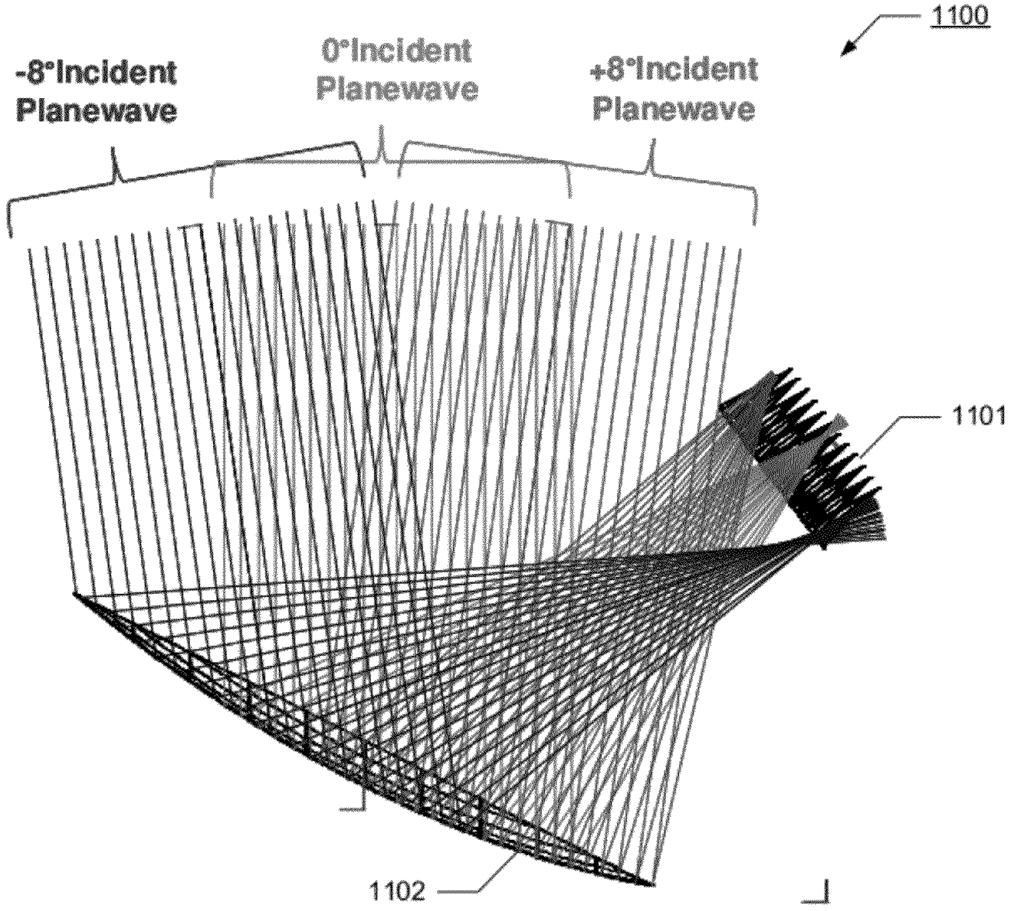

FIG. 9 illustrates one method for forming multiple beams using an array-fed reflector. In antenna system 900, an array 901 of feed elements illuminates a parabolic reflector to generate 3 beams. Because array 901 is disposed in the focal plane of parabolic reflector 901, only a single feed element is used to generate each of the three beams. FIG. 10 illustrates a similar antenna system 1000 with a parabolic reflector 1002, in which an array 1001 of feed elements has been physically defocused by moving array 1001 closer to reflector 1002 (i.e., out of the focal plane thereof). At this distance, each of the feed elements in array 1001 can contribute to each of the beams formed using phase-steering only, but the undesirable geometry results in a number of problems, not the least of which is the blockage of the +8° incident plane wave by array 1001. FIG. 11 illustrates a compromise arrangement, in which an antenna system 1100 has an array 1101 disposed closer to a parabolic reflector 1102 than the focal plane thereof, but not so close that every feed element can contribute to every beam. Rather, small groups of feed elements are used to contribute to each beam (using both amplitude and phase excitation control), but no feed element contributes to more than one beam. The need to provide both amplitude and phase control, and the (less severe) geometry problems add to the complexity and undesirability of this system.

Figure 12:
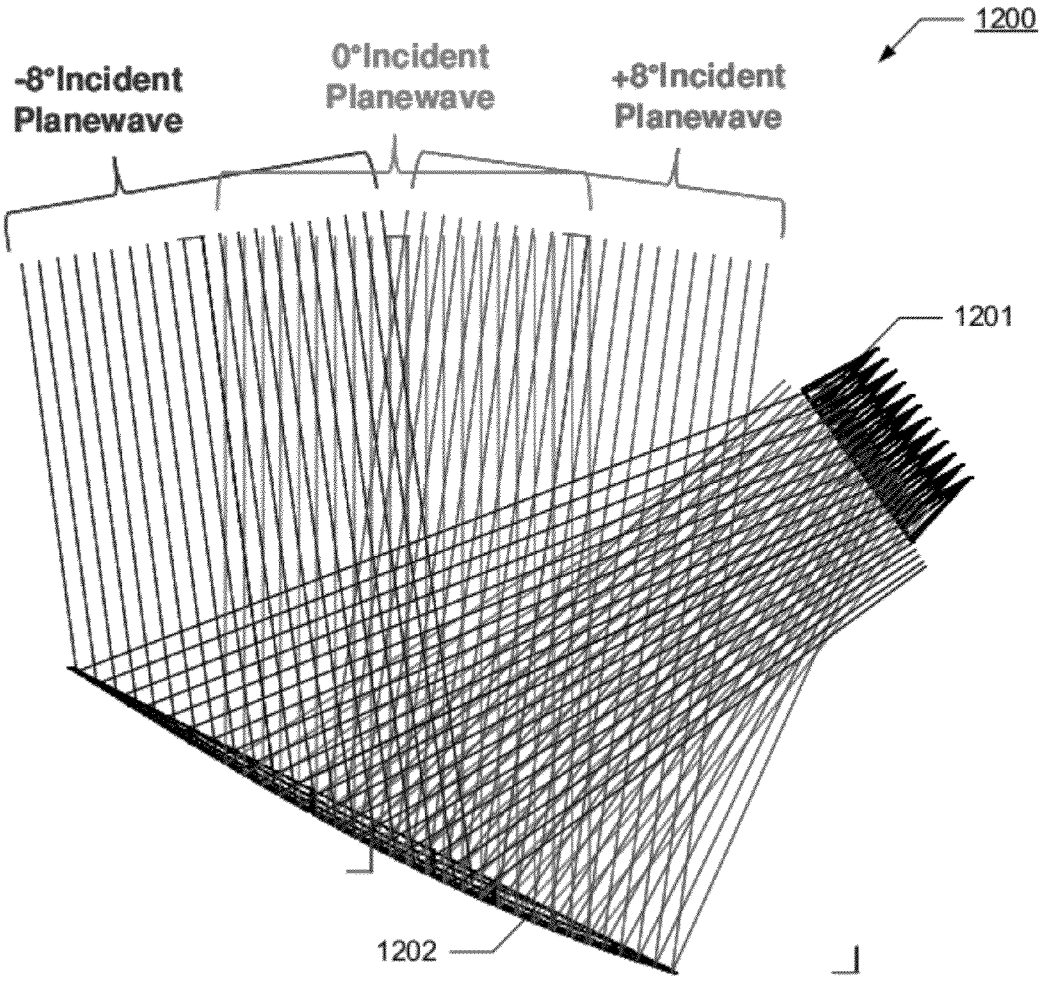
FIG. 12 illustrates forming multiple beams using a non-focused reflector according to one aspect of the subject disclosure.

FIG. 12, by way of contrast, shows one embodiment of the subject disclosure in which an antenna system 1200 includes an array 1201 of feed antennas disposed in the focal plane of a non-focused reflector 1202 (e.g., a reflector with a curvature that creates a symmetrical quadratic phase-front in an aperture plane of the reflector). As can be see by tracing the rays of the beams illustrated in FIG. 12, each element of array 1201 can contribute to each of the beams (using phase-steering only), and the geometry of the system remains optimal. This arrangement can provide the same performance as the systems of FIGS. 8 to 10 with fewer feed elements or, conversely, can provide better performance when using the same number of feed elements.

Figure 13:
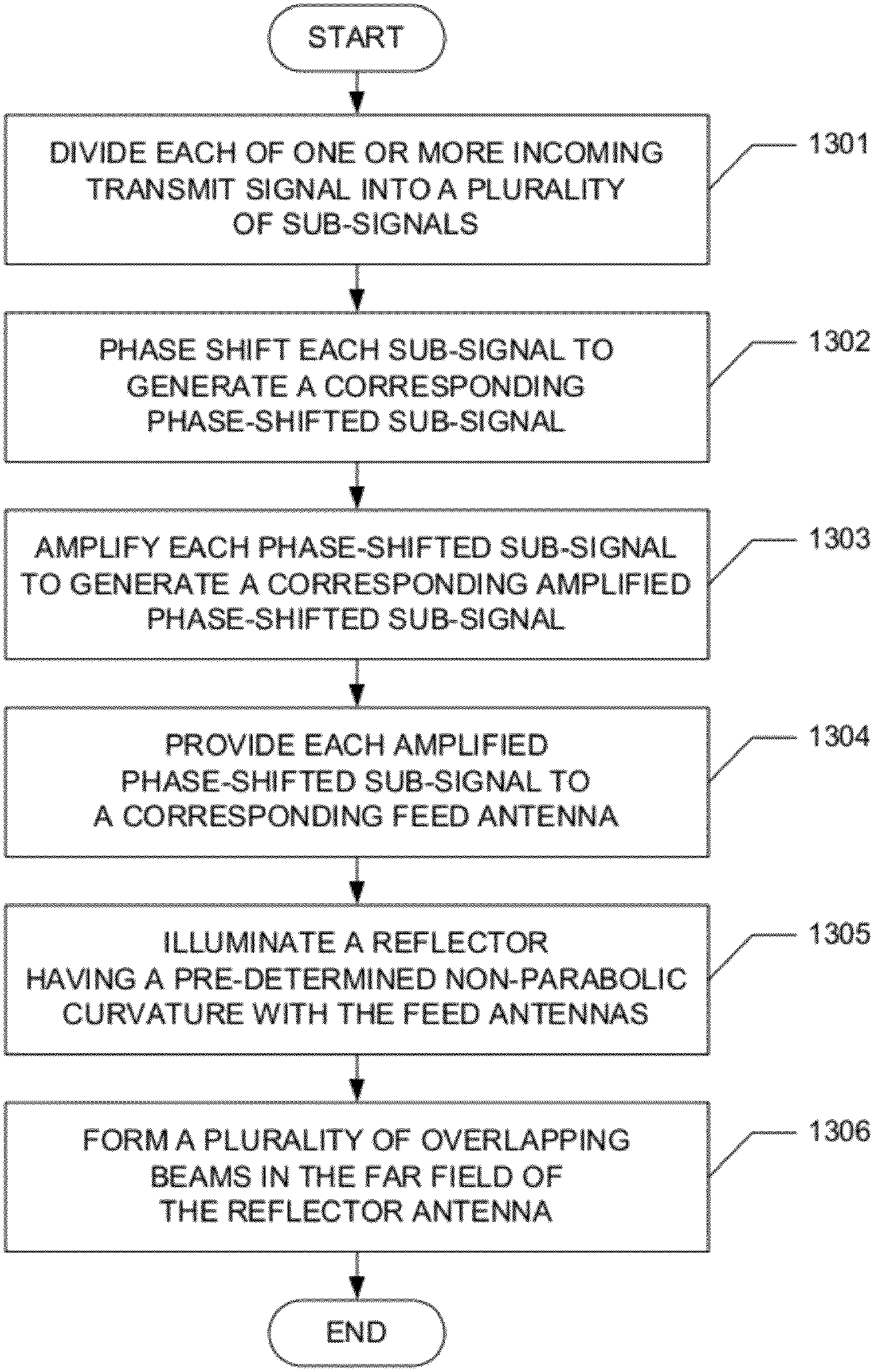
FIG. 13 is a flowchart illustrating a method for generating and configuring a plurality of beams in accordance with one aspect of the subject disclosure.

FIG. 13 is a flowchart illustrating a method for generating and configuring a plurality of beams using an antenna system including a reflector having a non-parabolic curvature configured to create a symmetrical quadratic phase-front in an aperture plane of the reflector, and a plurality of feed antennas disposed in a focal plane of the reflector, according to one aspect of the subject disclosure. The method begins with step 1301, in which each of one or more incoming signals is divided with a beamforming network into a plurality of sub-signals. Each sub-signal corresponds to one of the plurality of feed antennas, and also corresponds to each of the plurality of beams. In step 1302, the plurality of sub-signals are phase-shifted with a plurality of variable phase shifters. Each variable phase shifter receives one of the plurality of sub-signals from the beamforming network and phase shifts the one of the plurality of sub-signals to generate a corresponding phase-shifted sub-signal. In step 1303, the plurality of phase-shifted sub-signals are amplified with a plurality of fixed-amplitude amplifiers. At least one amplifier corresponds to each of the plurality of feed antennas. The at least one amplifier for each feed antenna amplifies a corresponding phase-shifted sub-signal to generate an amplified phase-shifted sub-signal which is provided to the corresponding feed antenna in step 1304. In step 1305, the reflector is illuminated with the plurality of feed antennas to generate the plurality of beams. The curvature of the reflector creates a symmetrical quadratic phase-front in an aperture plane of the reflector. In step 1306, a plurality of overlapping beams are formed in the far field of the reflector antenna. While the steps illustrated with respect to FIG. 13 are ordered for a transmit operation with an antenna system, it will be apparent to those of requisite skill in the art that similar steps can be completed in the reverse order for a receive operation therewith, in accordance with one aspect of the subject disclosure.

Figure 14:
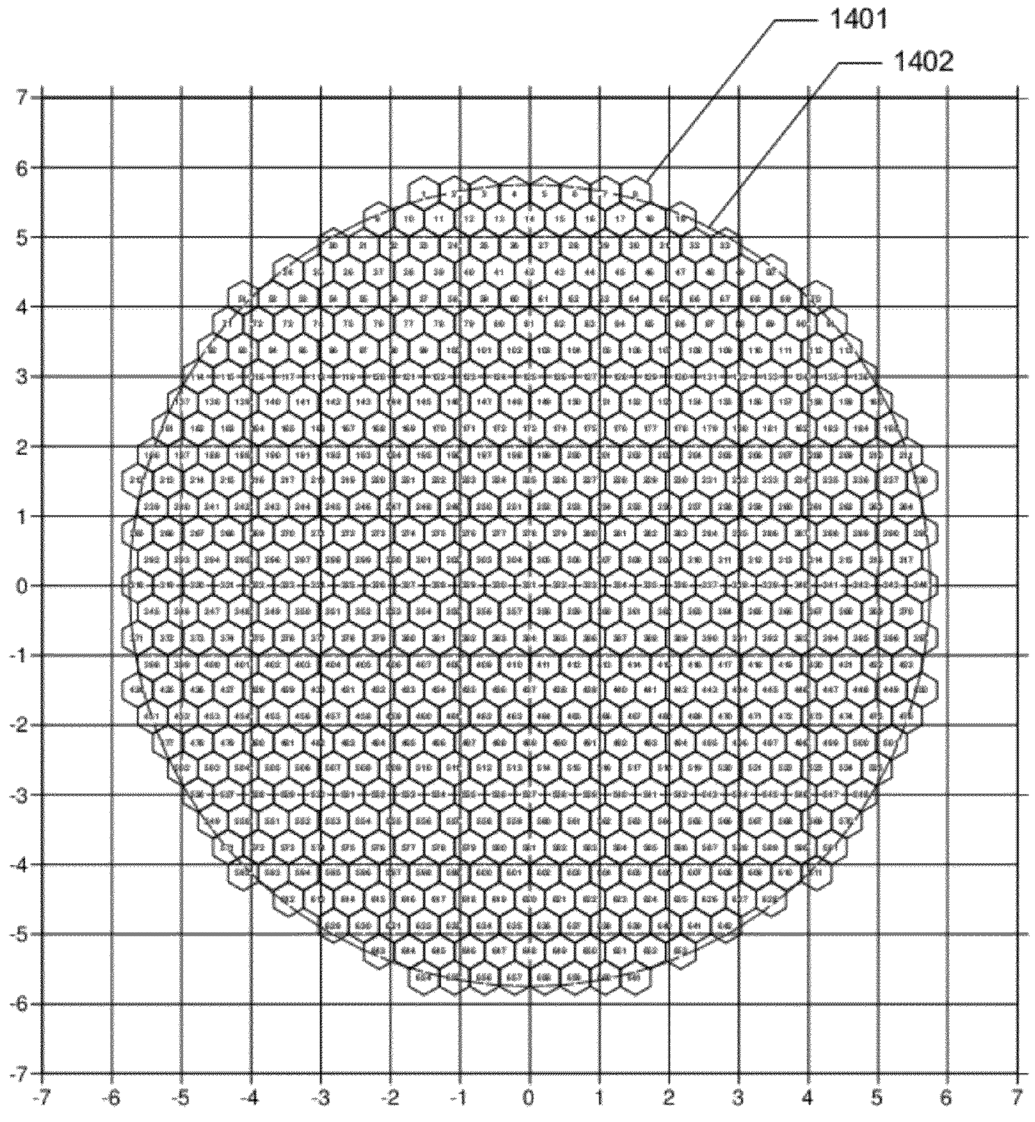
FIG. 14 illustrates an exemplary composite beam cell layout in accordance with one aspect of the subject disclosure.
Figure 15:
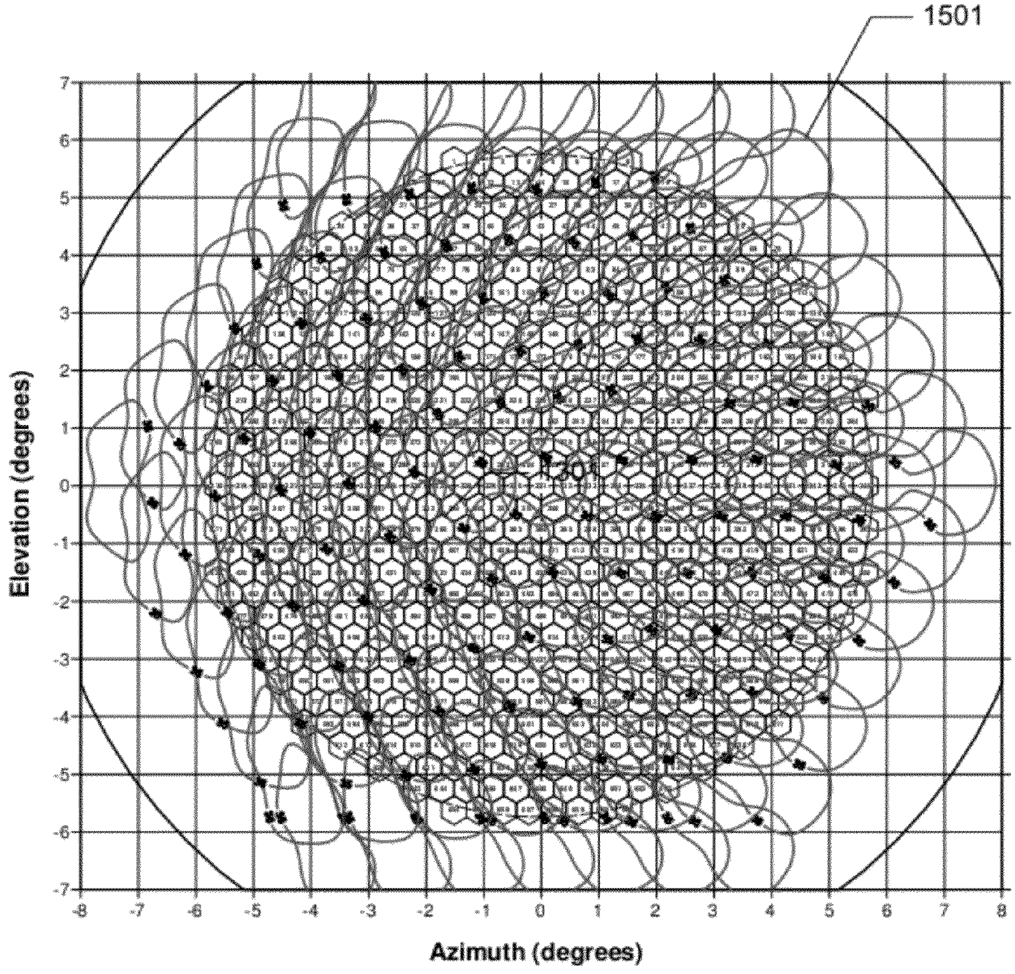
FIG. 15 illustrates the coverage of non-focused component beams used to create the exemplary composite beam cell layout of FIG. 14, in accordance with one aspect of the subject disclosure.
Figure 16:
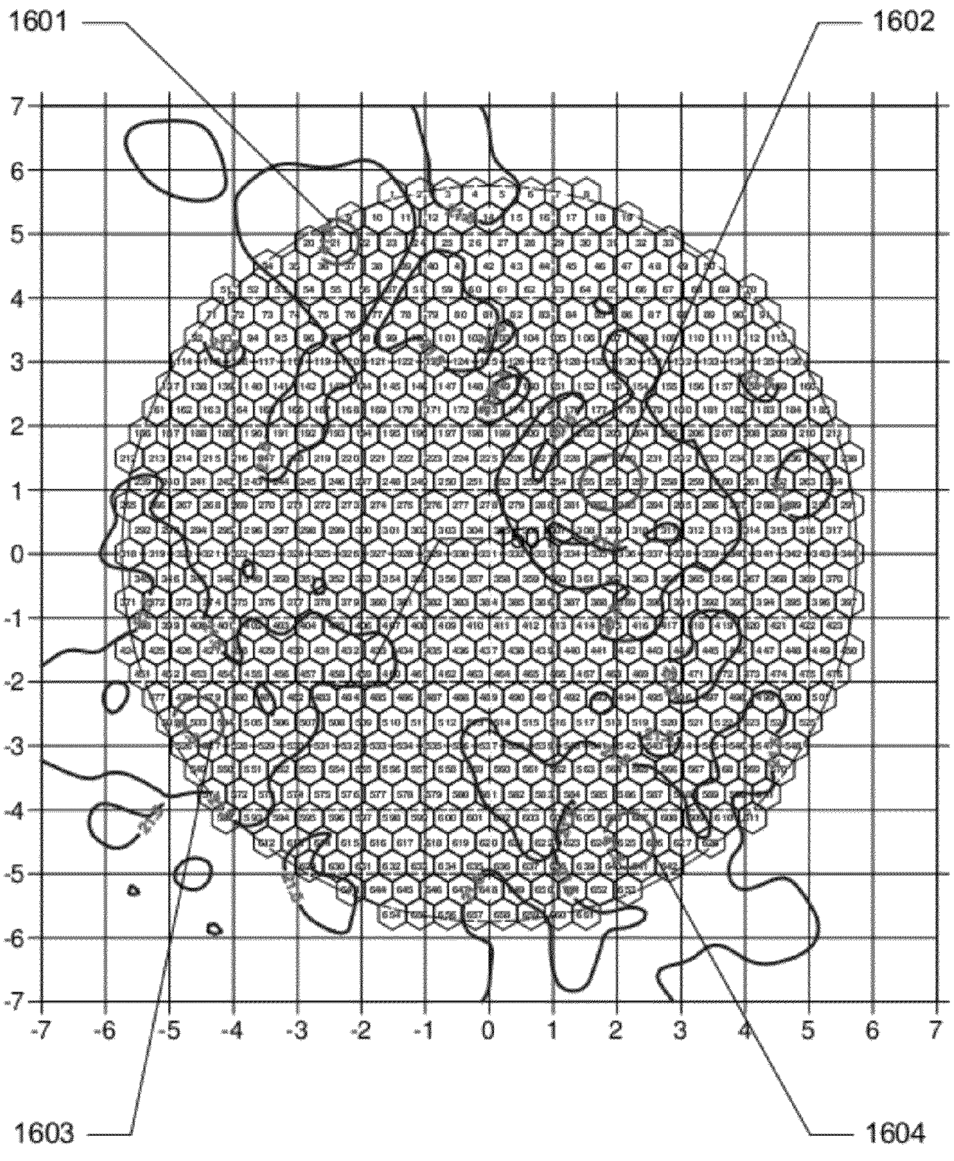
FIG. 16 illustrates an exemplary composite beam pattern after beamforming in accordance with one aspect of the subject disclosure.

FIG. 14 illustrates an exemplary composite beam cell layout in accordance with one aspect of the subject disclosure. The layout includes 661 beams, such as beam 1401, within a 11.5° circle (1402). As can be seen with reference to FIG. 15, 127 non-focused component beams 1301 (e.g., produced by 127 feed elements) are used to create the exemplary composite beam cell layout of FIG. 14. In the exemplary embodiment of FIG. 15, each non-focused component beam 1501 is shown with as an outline representing coverage above a 35 dBi directivity level. In accordance with one aspect, by using the beamforming techniques and systems illustrated in greater detail above, various composite beams with higher signal strengths can be created from the component beams 1301 illustrated in FIG. 15. For example, FIG. 16 overlays an exemplary composite beam pattern after beamforming in accordance with one aspect of the subject disclosure, in which multiple composite beams 1601-1604 enjoy coverage regions with greater than 41.5 dBi directivity.

Figure 17:
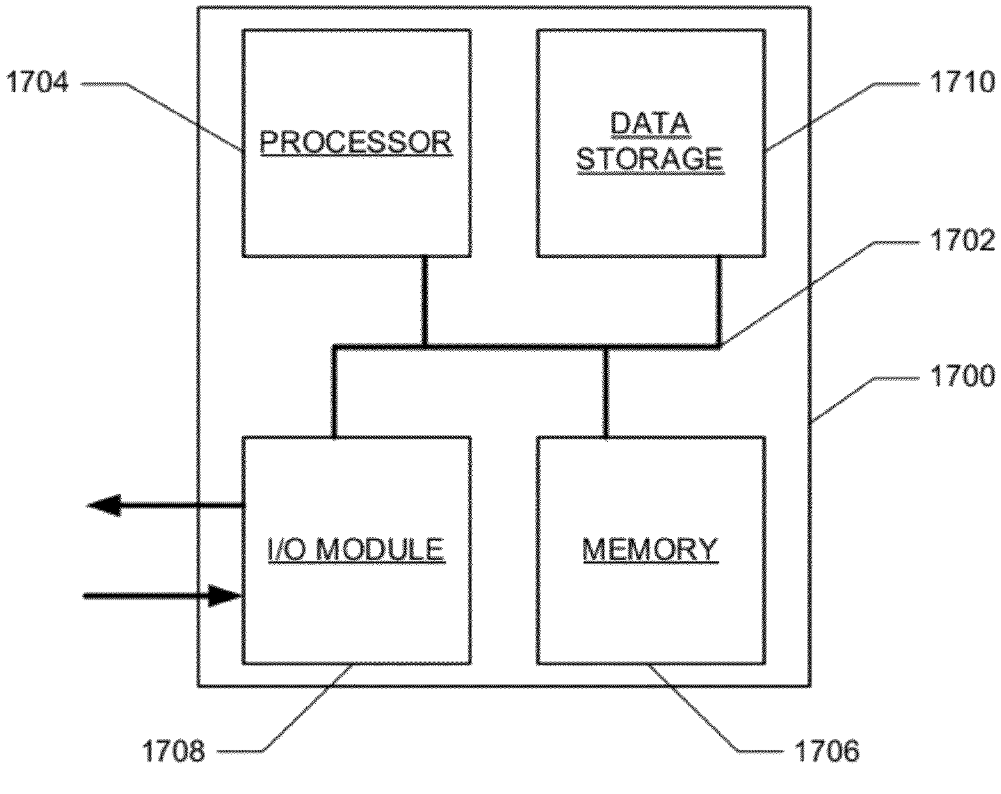
FIG. 17 is a block diagram that illustrates a computer system upon which an embodiment of the subject disclosure may be implemented.

FIG. 17 is a block diagram that illustrates a computer system 1700 upon which an embodiment of the subject disclosure may be implemented. Computer system 1700 includes a bus 1702 or other communication mechanism for communicating information, and a processor 1704 coupled with bus 1702 for processing information. Computer system 1700 also includes a memory 1706, such as a random access memory ("RAM") or other dynamic storage device, coupled to bus 1702 for storing information and instructions to be executed by processor 1704. Memory 1706 may also be used for storing temporary variables or other intermediate information during execution of instructions by processor 1704. Computer system 1700 further includes a data storage device 1710, such as a magnetic disk or optical disk, coupled to bus 1702 for storing information and instructions.

Computer system 1700 may be coupled via I/O module 1708 to a display device (not illustrated), such as a cathode ray tube ("CRT") or liquid crystal display ("LCD") for displaying information to a computer user. An input device, such as, for example, a keyboard or a mouse may also be coupled to computer system 1700 via I/O module 1708 for communicating information and command selections to processor 1704.

According to one embodiment of the subject disclosure, generating and configuring a plurality of beams with an antenna system may be performed by a computer system 1700 in response to processor 1704 executing one or more sequences of one or more instructions contained in memory 1706. Such instructions may be read into memory 1706 from another machine-readable medium, such as data storage device 1710. Execution of the sequences of instructions contained in main memory 1706 causes processor 1704 to perform the process steps described herein. One or more processors in a multi-processing arrangement may also be employed to execute the sequences of instructions contained in memory 1706. In alternative embodiments, hard-wired circuitry may be used in place of or in combination with software instructions to implement various embodiments of the subject disclosure. Thus, embodiments of the subject disclosure are not limited to any specific combination of hardware circuitry and software.

The term "machine-readable medium" as used herein refers to any medium that participates in providing instructions to processor 1704 for execution. Such a medium may take many forms, including, but not limited to, non-volatile media, volatile media, and transmission media. Non-volatile media include, for example, optical or magnetic disks, such as data storage device 1710. Volatile media include dynamic memory, such as memory 1706. Transmission media include coaxial cables, copper wire, and fiber optics, including the wires that comprise bus 1702. Transmission media can also take the form of acoustic or light waves, such as those generated during radio frequency and infrared data communications. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

While the present invention has been particularly described with reference to the various figures and embodiments, it should be understood that these are for illustration purposes only and should not be taken as limiting the scope of the invention. There may be many other ways to implement the invention. Many changes and modifications may be made to the invention, by one having ordinary skill in the art, without departing from the spirit and scope of the invention.

What is claimed is:

1. An antenna system for generating and distributing power among a plurality of beams, the antenna system comprising:

a reflector having a focal plane and a non-parabolic curvature configured to form the beams, the curvature being configured to create a symmetrical quadratic phase-front in an aperture plane of the reflector;

a plurality of feed antennas configured to illuminate the reflector, each feed antenna being disposed in the focal plane of the reflector, and each feed antenna configured to contribute power toward each of the plurality of beams;

a beamforming network configured to divide an incoming signal into a plurality of sub-signals, each sub-signal corresponding to one of the plurality of feed antennas, each sub-signal corresponding to each of the plurality of beams, and to selectably allocate power among the plurality of beams;

a plurality of fixed-amplitude amplifiers, at least one amplifier corresponding to each of the plurality of feed antennas, the at least one amplifier for each feed antenna configured to amplify the corresponding sub-signal to generate an amplified sub-signal and to provide the amplified sub-signal to the corresponding feed antenna.

2. The antenna system of claim 1, wherein the beamforming network is configured to distribute power available from the plurality of fixed-amplitude amplifiers among the plurality of beams.

3. The antenna system of claim 1, further comprising a plurality of variable phase shifters, each variable phase shifter configured to receive one of the plurality of sub-signals from the beamforming network, to phase shift the one of the plurality of sub-signals to generate a corresponding phase-shifted sub-signal, and to provide each phase-shifted sub-signal to a corresponding one of the plurality of fixed-amplitude amplifiers.

4. The antenna system of claim 3, wherein the plurality of variable phase shifters phase shift the plurality of sub-signals to modify a shape or a direction of the plurality of beams.

5. The antenna system of claim 1, wherein the beamforming network is configured to phase-shift each of the plurality of sub-signals.

6. The antenna system of claim 1, wherein at least two amplifiers correspond to each of the plurality of feed antennas, the antenna system further comprising:

a plurality of pre-amp dividing networks, each pre-amp dividing network corresponding to one of the plurality of sub-signals, each pre-amp dividing network dividing the corresponding sub-signal into a plurality of divided sub-signals and providing each divided sub-signal to a corresponding one of the at least two amplifiers; and a plurality of combining networks, each combining network corresponding to one of the plurality of pre-amp dividing networks, each combining network combining a plurality of amplified divided sub-signals received from the at least two amplifiers into a corresponding amplified sub-signal and providing the amplified sub-signal to the corresponding feed antenna.

7. The antenna system of claim 1, wherein the at least one amplifier corresponding to each of the plurality of feed antennas comprises a same number of amplifiers corresponding to each of the plurality of feed antennas.

8. The antenna system of claim 1, wherein each amplified sub-signal has a same amplitude as every other amplified sub-signal.

9. A method for generating and configuring a plurality of beams using an antenna system including a reflector having a non-parabolic curvature configured to create a symmetrical quadratic phase-front in an aperture plane of the reflector, and a plurality of feed antennas disposed in a focal plane of the reflector, the method comprising the steps of:

dividing an incoming signal with a beamforming network into a plurality of sub-signals, each sub-signal corresponding to one of the plurality of feed antennas, each sub-signal corresponding to each of the plurality of beams;

selectably allocating power among the plurality of beams with the beamforming network;

phase shifting the plurality of sub-signals to generate a corresponding phase-shifted sub-signal;

amplifying the plurality of phase-shifted sub-signals with a plurality of fixed-amplitude amplifiers, at least one amplifier corresponding to each of the plurality of feed antennas, the at least one amplifier for each feed antenna amplifying a corresponding phase-shifted sub-signal to generate an amplified phase-shifted sub-signal which is provided to the corresponding feed antenna; and illuminating the reflector with the plurality of feed antennas to generate the plurality of beams, wherein the curvature of the reflector creates a symmetrical quadratic phase-front in an aperture plane of the reflector.

10. The method of claim 9, wherein the beamforming network distributes power available from the plurality of fixed-amplitude amplifiers among the plurality of beams.

11. The method of claim 9, wherein at least two amplifiers correspond to each of the plurality of feed antennas, the method further comprising the steps of:

dividing the corresponding phase-shifted sub-signal into a plurality of divided phase-shifted sub-signals in a plurality of pre-amp dividing networks, each pre-amp dividing network corresponding to one of the plurality of phase-shifted sub-signals;

providing each divided phase-shifted sub-signal to a corresponding one of the at least two amplifiers; and combining a plurality of amplified divided phase-shifted sub-signals received from the at least two amplifiers in a plurality of combining networks, each combining network corresponding to one of the plurality of pre-amp dividing networks and providing the amplified phase-shifted sub-signal to the corresponding feed antenna.

12. The method of claim 9, wherein the at least one amplifier corresponding to each of the plurality of feed antennas comprises a same number of amplifiers corresponding to each of the plurality of feed antennas.

13. The method of claim 9, wherein each amplified phase-shifted sub-signal has a same amplitude as every other amplified phase-shifted sub-signal.

14. The method of claim 9, wherein a plurality of variable phase shifters are configured to phase shift the plurality of sub-signals to modify a shape or a direction of the plurality of beams.

15. An antenna system for generating and distributing power among a plurality of beams, the antenna system comprising:

a beamforming network configured to divide an input signal into a plurality of transmit sub-signals, each transmit sub-signal corresponding to each of the plurality of beams;

a first plurality of fixed-amplitude amplifiers, each configured to amplify one of the plurality of transmit sub-signals to generate a corresponding amplified transmit sub-signal;

plurality of diplexers, each configured to receive a corresponding one of the plurality of amplified transmit sub signals from a corresponding one of the first plurality of fixed-amplitude amplifiers and to provide the amplified transmit sub signal to a corresponding one of a plurality of feed antennas;

the plurality of feed antennas configured to illuminate a reflector, each feed antenna configured to contribute power toward each of the plurality of beams;

the reflector having a focal plane in which the plurality of feed antennas are disposed, the reflector having a non-parabolic curvature configured to create a symmetrical quadratic phase-front in an aperture plane of the reflector;

the plurality of diplexers, wherein each diplexer is further configured to receive a corresponding one of a plurality of received sub-signals from the corresponding one of the plurality of feed antennas and to provide the received sub-signal to a corresponding one of a second plurality of fixed-amplitude amplifiers;

the second plurality of fixed-amplitude amplifiers, each configured to amplify a corresponding one of the plurality of received sub-signals to generate a corresponding amplified received sub-signal; and the beamforming network configured to combine the plurality of amplified received sub-signals to generate an output signal.

16. The antenna system of claim 15, further comprising:

a local oscillator configured to generate a clock signal;

a plurality of upconverters configured to receive the clock signal from the local oscillator, each upconverter configured to upconvert a corresponding one of the plurality of transmit sub-signals to generate an upconverted transmit sub-signal and to provide the upconverted transmit sub-signal to a corresponding one of the first plurality of fixed-amplitude amplifiers; and a plurality of downconverters configured to receive the clock signal from the local oscillator, each downconverter configured to downconvert a corresponding one of the plurality of amplified received sub-signals to generate an downconverted amplified received sub-signal and to provide the downconverted amplified received sub-signal to the beamforming network.

17. The antenna system of claim 15, wherein the beamforming network is configured to distribute power available from the first plurality of fixed-amplitude amplifiers among the plurality of beams.

18. The antenna system of claim 15, further comprising a plurality of variable phase shifters, each variable phase shifter configured to receive one of the plurality of transmit sub-signals from the beamforming network, to phase shift the one of the plurality of transmit sub-signals to generate a corresponding phase-shifted transmit sub-signal, and to provide each phase-shifted transmit sub-signal to a corresponding one of the first plurality of fixed-amplitude amplifiers.

19. The antenna system of claim 18, wherein the plurality of variable phase shifters phase shift the plurality of transmit sub-signals to modify a shape or a direction of the plurality of beams.

20. The antenna system of claim 15, wherein the beamforming network is configured to phase-shift each of the plurality of transmit sub-signals.

21. The antenna system of claim 15, wherein each amplified transmit sub-signal has a same amplitude as every other amplified sub-signal.

22. An antenna system comprising:

a reflector having a non-parabolic curvature configured to create a symmetrical quadratic phase-front in an aperture plane of the reflector;

a plurality of feed antennas disposed in a focal plane of the reflector;

a plurality of diplexers, wherein each diplexer is configured to receive a corresponding one of a plurality of received sub-signals from a corresponding one of the plurality of feed antennas and to provide the received sub-signal to a corresponding one of a plurality of fixed-amplitude amplifiers;

the plurality of fixed-amplitude amplifiers, each configured to amplify a corresponding one of the plurality of received sub-signals to generate a corresponding amplified received sub-signal; and a beamforming network configured to combine the plurality of amplified received sub-signals to generate an output signal.

* * * * *